ZDZISLAW R. SUMMERS
ANTHONY P. MORREALE
INVENTORS.

BY
Herzig, Walsh & Blackham
ATTORNEYS

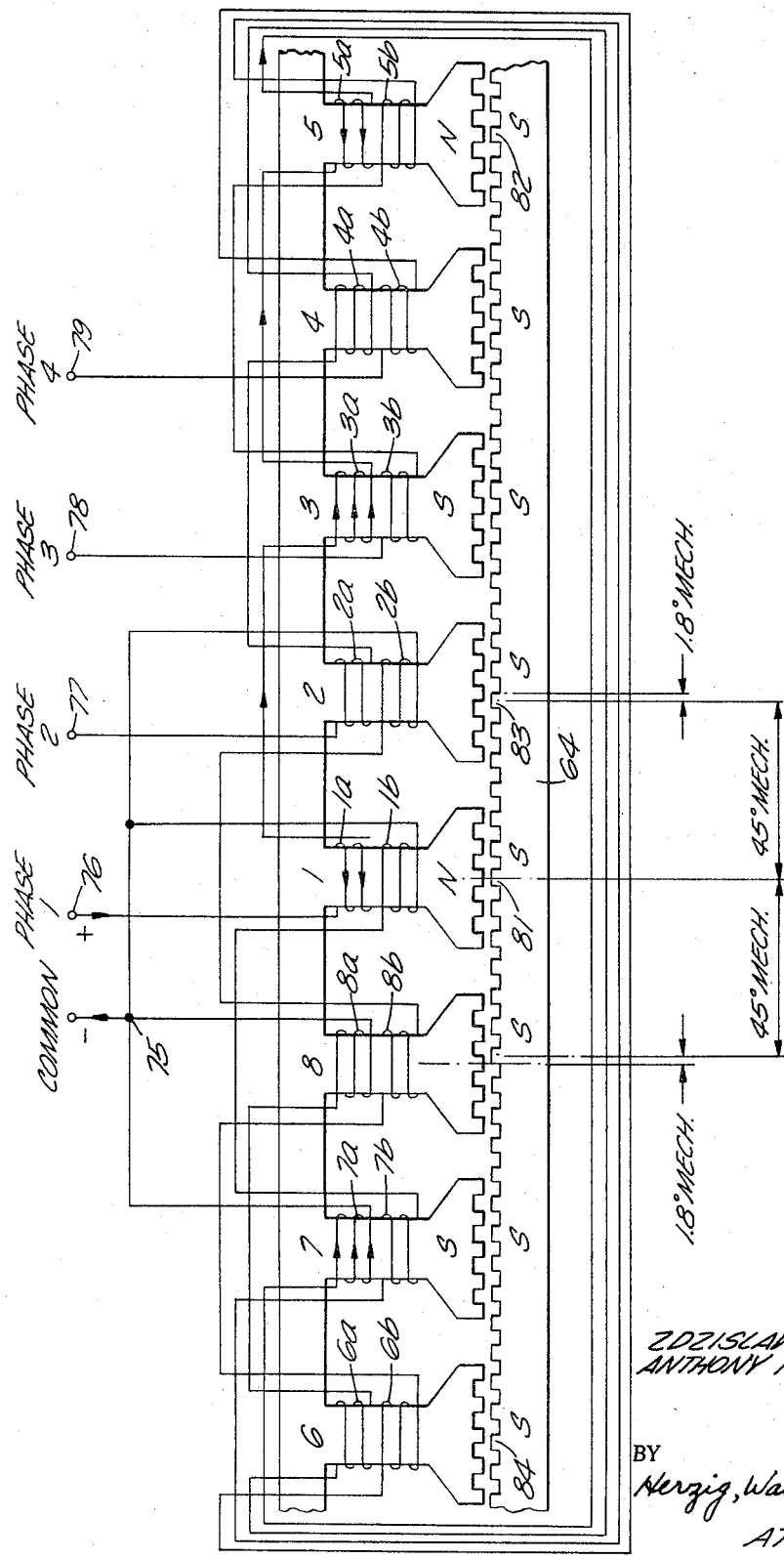

United States Patent Office 3,428,837
Patented Feb. 18, 1969

3,428,837
SMALL ANGLE STEPPING MOTOR WITH OFFSET PERMANENT MAGNET ROTOR HAVING AXIALLY LOCATED POLE SHOES
Anthony P. Morreale, Whittier, and Zdzislaw R. Summers, Long Beach, Calif., assignors to IMC Magnetics Corp., a corporation of California
Filed Apr. 21, 1966, Ser. No. 544,191
U.S. Cl. 310—49        14 Claims
Int. Cl. H02k 37/00

ABSTRACT OF THE DISCLOSURE

An electrical motor of the stepper type that operates in small discrete steps. The rotor comprises a cylindrical permanent magnet having pole shoes in the form of end caps at the ends. The permanent magnet itself is offset axially with respect to the stator, one pole shoe having teeth being directly within the bore of the stator. With this pole shoe configuration the magnetic field extends through part of the motor housing as well as the stator.

The stator poles and one rotor pole shoe are provided with teeth in relative numbers to produce a motor having two hundred discrete steps per revolution, having a magnitude of 1.8 degrees. The stator is provided with eight poles having two windings with a total of 16 windings wired in four phases, there being four series connected windings in each of the four phases.

---

This invention relates to an improved electrical stepper motor particularly adapted to be operated in small discrete steps. In an exemplary form of the invention, it is designated to have 200 discrete steps having a magnitude of 1.8°. The invention, however, may be embodied in constructions having other numbers of steps.

The improvements in the motor reside in the construction of the rotor; the arrangement and assembly of the rotor, stator, and motor housing; and the arrangement of the stator poles and windings.

Having reference to the rotor assembly, in motors of this type it is, of course, desirable to provide for a relatively large number of steps yet with accurate stepping action. In motors of this type the faces of the stator poles are provided with teeth extending axially and the rotor has teeth which move adjacent to the teeth on the stator poles. To realize the desired number of steps, a substantial number of teeth are required on the rotor. However, it is also desired to keep the rotor relatively small and compact. One of the objects of the invention is to achieve compactness of the rotor while still having the necessary number of teeth. Inertia of the rotor is another factor involved in stepper motors of this type. In order to provide for fast stepping it is necessary that the inertia be kept small. Realization of this result is another object of the invention. Similarly, it is desired to limit the diameter of the rotor. In the exemplary embodiment of this invention, these objects and others are realized by way of a particular rotor construction and relative arrangement of the stator, rotor, and motor housing. The rotor includes a permanent magnet cylinder which is axially magnetized. Two pole shoes are provided which are cylindrical and on the ends of the magnet cylinder. One of these has approximately the same axial length as the axial dimension of the stator pole faces and peripheral teeth are provided on it. The other pole shoe is shorter and is positioned to rotate within a skirt which is a part of the motor housing extending inwardly into the interior thereof. The outer surface of this pole shoe is smooth, not having teeth. The result is that the magnetic field is through a stator pole, through the rotor and through part of the motor housing. This differentiates from arrangements wherein the rotor has two pole shoes each operating adjacent to a stator pole. In this way full utilization of the rotor for purposes of the magnetic field is realized.

The stepper motor of the invention is constructed to be capable of incremental rotational movement in either direction or to be stopped in any of its positions. Preferably the motor is of a synchronous type having a rotor including a permanent magnet and a plurality of circularly arranged stator poles having windings thereon. By selective energization of the windings the desired movement or stopping of the rotor is realized. In the exemplary form of the invention, the stator windings are connected in groups which may be groups of four windings per phase where the system is set up as a four-phase system, although, as described hereinafter, the arrangement may be set up to be a two-phase system. The motor is constructed to be operated in conjunction with a four-phase or two-phase reversible controller and operates in either direction depending upon the mode of excitation. The controller may be of an electronic type that feeds pulses to the motor to produce either clockwise or counter-clockwise rotation, the phases being excited sequentially.

In the exemplary form of the invention, there are sixteen stator coils or windings wound in four groups of four coils, four coils per phase, and which are arranged in the following manner. The four coils of phase one are placed on poles 1, 3, 5 and 7 in such manner that when energized the polarity of the poles is N, S, N and S, respectively. The four coils of the second phase are placed on poles 2, 4, 6 and 8 in the same manner, and when energized give the polarity, N, S, N and S, respectively. The four coils of phase three are placed on poles 1, 3, 5 and 7, but this time when energized give reversed polarity, i.e., S, N, S and N, respectively, and the four coils of phase four are placed on poles 2, 4, 6 and 8 again with the reversed polarity. Thus, each pole has two coils which give opposite polarity on different phases and when sequentially pulsed as referred to in the foregoing give a rotating field. Whenever one phase is energized there are two poles directly opposite each other polarized "north," and two poles directly opposite one another and at right angles to the "north" polarized poles that are polarized "south." The remaining four poles in between the polarized poles are neutral. When there are two poles directly opposite one another, polarized "north" as described above, at this instant the rotor teeth nearest the teeth of the two stator poles of the opposite polarity to that of the rotor teeth, will lock in position as shown in FIGURE 3, whereby they are in direct alignment. More accurately stated, due to the difference in tooth pitch between the stator and rotor, only the middle tooth of the stator pole will be in direct alignment with one of the rotor teeth, while the remaining four teeth of the same stator pole will be correspondingly offset from the rotor teeth. The teeth of the other two stator poles of the same polarity as the rotor will be at this instant opposite the slots between the rotor teeth and will have a repelling action on the rotor teeth evenly in both directions, thus acting as a damper reducing the overshot and eliminating the resonance. A further object of the invention is the elimination of the resonance in this way. The middle teeth of the nonenergized stator poles at this instant will be offset exactly 1.8° from the corresponding rotor teeth, and since the system is in complete symmetry, two of these will be offset to the right and two to the left of the rotor teeth. When phase two or four is next energized, the rotor will move 1.8° clockwise or counterclockwise, and when the phases are energized sequentially, the rotor will step continually in 1.8° increments in either CW or CCW direction depending upon the mode of excitation.

Further objects and additional advantages of the invention will become apparent from the following detailed description and annexed drawings wherein:

FIGURE 3 is a diagrammatic layout of the stator pole and rotor assembly showing the relationships of the teeth and showing the winding circuitry.

Figure 1:
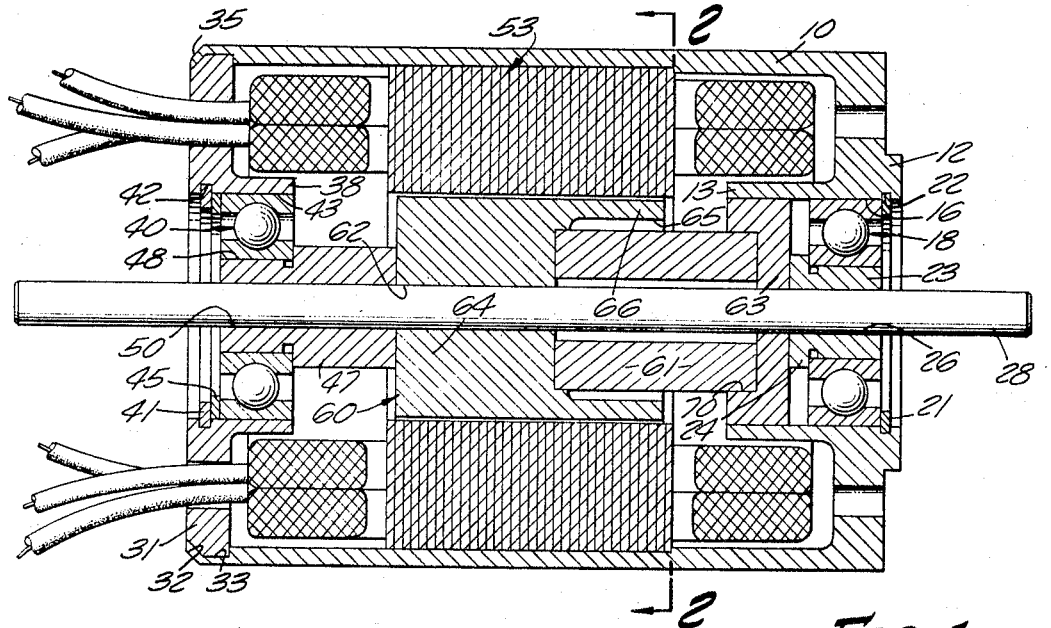
FIGURE 1 is a cross-sectional view of a preferred form of the motor assembly of the invention.
Figure 2:
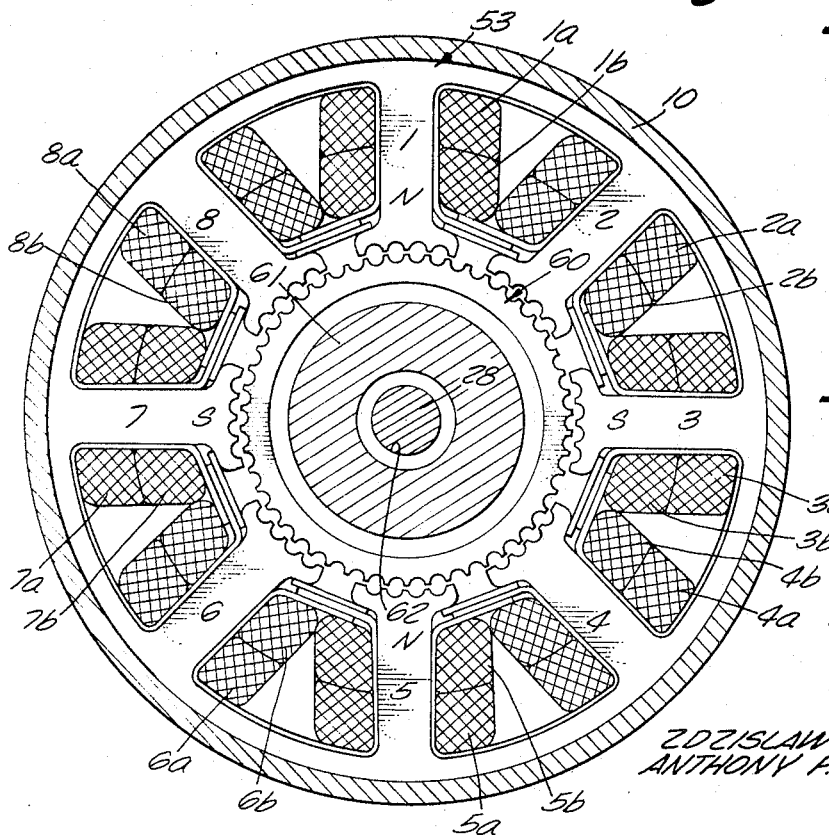
FIGURE 2 is a sectional view taken along the line 2—2 of FIGURE 1.

Referring now more in detail to FIGURES 1 and 2 of the drawing, the motor in the exemplary form shown comprises a generally cylindrical magnetically permeable housing 10. The right end of the housing has an extending boss 12 and an inwardly extending skirt 13. In the end there is a bore 16 which receives a bearing designated generally at 18 which includes conventional ball races and balls. The ball bearing is positioned at one end by snap ring 21 received in an annular slot 22 in the bore 16. Fitting in the bearing 18 is a nonmagnetic spacer 23 having a flange 24 which engages against the bearing and which has a bore 26 which is locked onto shaft 28.

At the other end of the motor housing 10 is an end cap 31 having an outer bevelled edge 32. It is received in a counterbore 33 in the end of housing 10 and the end edge of the housing is bent or clamped over the bevel 32 as shown at 35. The end cap 31 has an inwardly extending skirt 38 in which is received a second ball bearing 40 having conventional ball races and balls. The ball bearing 30 is held in place by a snap ring 41 received in an annular groove 42 in the bore 43 in the end cap 31. Between the snap ring 41 and the bearing 40 is a spacer washer 45. Numeral 47 designates a cylindrical nonmagnetic spacer member having a portion of smaller diameter as designated at 48, which fits into the bearing 40. The spacer member 47 has a bore 50 which is locked onto shaft 28.

Referring to the stator assembly, it is of laminated construction, as designated generally at 53 in the figures. It comprises a cylindrical structure fitting within the housing 10 and having inwardly extending poles which are numbered 1 to 8 in FIGURE 2. The poles have enlarged end faces which are arcuate and positioned adjacent the periphery of the rotor. The pole faces have axial teeth; in the construction shown, each pole face has five teeth with four spaces between the teeth. The pole and winding arrangement is shown schematically in FIGURE 3.

Each pole has on it two windings designated 1a and 1b for pole 1 and being correspondingly designated for the other poles. The windings are suitably covered and insulated in their positions around the stator poles. The stator poles are positioned midway between the ends of the motor housing.

The rotor is designated generally by the numeral 60. It comprises a permanent magnet cylinder 61 having a bore 62 through which the shaft 28 passes. There are two pole shoes on the end of the magnet rotor as designated at 63 and 64, the pole shoes being fixed on the motor shaft 28.

The pole shoe 64 has substantially the same axial extent as the axial extent of the stator pole faces. At its right end it has a bore 65 which forms a skirt 66 spaced from the magnet 61. The magnet 61 is displaced axially from the stator poles. The pole shoe 63 is of shorter axial extent. It has a bore or recess 70 which the end of the magnet 61 fits into. The shoe 63 rotates within and adjacent the skirt 13 which is part of the magnetic motor housing. The pole shoe 63 has a smooth peripheral surface without teeth.

The pole shoe 64 has peripheral teeth similar to those on the faces of the stator pole. It has fifty such teeth evenly spaced on the outside diameter. Since each stator pole has five teeth, there are a total of forty teeth on the stator poles. Each slot opening between stator poles on the inside diameter is equivalent to the width of one tooth and two slots between pole teeth. The arrangement of teeth on the pole faces and rotor provide for 200 definite positions in one revolution of the rotor where some of the rotor teeth are in line with the corresponding number of stator teeth, and the rotor, when the motor is deenergized, will settle in one of these 200 positions.

FIGURE 3 is a developed view showing the relative layout of the stator poles with respect to the pole shoe 64. There are sixteen coils wound in four groups of four coils, i.e., four coils per phase. The coils of each group are in series and each group has a connection to the common terminal 75. The two coils on each pole are wound oppositely so that energization of one or the other of the coils produces opposite polarity. The four coils of phase one are connected to terminal 76 and are on the outer parts of poles 1, 3, 5 and 7 and are wound so that when energized the polarity of these poles is N, S, N, and S, respectively. The four coils of phase two are connected to terminal 77 and are on the outer parts of poles 2, 4, 6 and 8 in the same manner and when energized give the polarity N, S, N and S, respectively. The four coils of phase three are connected to terminal 78 and are on the inner parts of poles 1, 3, 5 and 7, but are so wound that when energized, give reverse polarity, i.e., S, N, S and N, respectively. The four coils of phase four are connected to terminal 79 and are on the inner parts of poles 2, 4, 6 and 8, again with reverse polarity. Thus each pole has two coils which give opposite polarity on different phases, so that when sequentially pulsed give a rotating field.

From the foregoing, those skilled in the art will understand the operation of the stepper motor. As stated in the foregoing, the motor operates in conjunction with a four-phase or two-phase reversible controller and steps in 1.8° increments in either direction of rotation depending upon the mode of excitation. Other stepping angles can be accommodated using the same principle by using a rotor and stator with suitable numbers of teeth. Preferably, the controller is of a type which supplies pulses sequentially into the four phases and this may be for rotation in either a clockwise (CW) or a counterclockwise (CCW) direction. The stepping is accurate and discrete without resonance. It will be observed that on energizing one phase of the stator windings two poles directly opposite one another will be polarized "north" and two poles directly opposite one another at right angles to the north polarized poles will be polarized "south," and the remaining four poles in between the polarized poles are neutral. At this instant, the rotor teeth nearest the teeth of the two stator poles of the opposite polarity to that of the rotor teeth will lock in position, as shown in FIGURE 3, whereby they are in direct alignment. More accurately stated, due to the difference in tooth pitch between the stator and rotor, only the middle tooth of the stator pole will be in direct alignment with one of the rotor teeth while the remaining four teeth of the same stator pole will be correspondingly offset from the rotor teeth. This is illustrated at 81 in FIGURE 3. The teeth of the other two stator poles of the same polarity as the rotor will be at this instant opposite the slots between the rotor teeth and will have a repelling action on the rotor teeth evenly in both directions, thus acting as a damper reducing the overshoot and eliminating the resonance. In other words, the stepping is fast and when the motor stops it will stop accurately positioned in one of its 200 discrete positions, which positions are established by the tooth relationships as described. The middle teeth of the nonenergized stator poles at the instant described will be offset exactly 1.8° from the corresponding rotor teeth and since the system is in complete symmetry two of these will be offset to the right and two to the left of the rotor teeth. When phase two or four is next energized, the rotor will move 1.8° CW or CCW, and when the phases are energized sequentially the rotor will step continually in 1.8° increments in either CW or CCW direction, depending upon the mode of excitation.

The following will further make clear as to why the motor has 200 discrete positions. In FIGURE 3, when a pulse has been supplied to phase one windings 1a, 3a, 5a, and 7a are energized. Poles 1 and 5 are now polarized "north" which is opposite to the "south" polarity of the pole shoe 64. The middle tooth of pole 1 is exactly aligned with tooth 81 on the rotor pole shoe 64 and the middle tooth of pole 5 is exactly aligned with tooth 82 of pole shoe 64. If a pulse is supplied to terminal 2 energizing phase 2, the outer windings, i.e., outer windings 2a, 4a, 6a, and 8a of poles 2, 4, 6 and 8 are energized. Poles 2 and 6 now have a "north" polarity which is opposite to the "south" polarity of the pole shoe 64. Tooth 83 of the pole shoe 64 will now align itself with the middle tooth of pole 2 and tooth 84 on the rotor will align itself with the middle tooth on pole 6. The rotor has 50 teeth and 50 spaces between teeth, so there are 100 teeth and spaces. It will be observed that when phase 2 was energized, tooth 83 on the rotor in aligning itself with the middle tooth of pole 2 moved through an angular distance equal to approximately half of a tooth. Thus, it will be observed that considering the amount of movement of the rotor on an energization of an individual phase, 200 such energizations or pulses are required to move the rotor through a complete revolution, or in other words, the rotor has 200 discrete steps. It will be observed that there is a difference in pitch as between the teeth on the rotor and the teeth on the pole faces which determines the angular movement of the rotor on each step. By varying this differential, or in other words, by selecting the number of teeth to be provided on the pole face relative to the number on the rotor, the angular stepping increments can be varied which will, of course, vary the number of steps necessary for a complete revolution.

From the foregoing, those skilled in the art will observe that the invention as described herein achieves and realizes all of the objects and advantages as set forth in the foregoing as well as having many additional advantages that are apparent from the detailed description.

The foregoing disclosure is representative of a preferred form of the invention and is to interpreted in an illustrative rather than a limiting sense, the invention to be accorded the full scope of the claims appended hereto.

What is claimed is:

1. A rotor and stator assembly comprising a laminated core assembly having poles with windings thereon, a shaft having a rotor thereon, a motor housing, said rotor including a cylindrical permanent magnet, said rotor having a first pole shoe positioned to rotate adjacent surfaces of the stator poles, said rotor having a second pole shoe positioned to rotate adjacent a part of the motor housing whereby a flux circuit is produced through the rotor pole shoes, the housing and the stator assembly.

2. A structure as in claim 1 wherein the pole shoes are on the ends of the permanent magnet, the motor housing having an inwardly extending skirt portion concentric with the axis of the housing, the second pole shoe being positioned to rotate within said skirt portion.

3. A structure as in claim 1 wherein said first pole shoe has an axial dimension approximately the same as the axial dimension of the faces of the stator poles.

4. A structure as in claim 1 wherein the said permanent magnet is displaced axially from the stator poles, the first pole shoe having substantially the same axial dimension as the faces of the stator poles, the motor housing having an inwardly extending skirt and said second pole shoe being positioned to rotate within said skirt.

5. A structure as in claim 1 wherein said pole faces have teeth formed therein and said first pole shoe has peripheral teeth rotatable adjacent the teeth on the pole faces.

6. A stepping motor comprising a rotor and a stator having a plurality of poles so arranged that each pole is diametrically opposite another pole, windings on each pole arranged to be energized for polarizing the pole either "north" or "south," means connecting windings on alternate poles in series phase groups, the windings being so connected that the said alternate poles have opposite polarity, the first windings of the said phase groups being on successive poles, whereby energization of individual phase groups energizes alternate poles of the group with opposite polarity; the number of poles being such that on energizing one phase group of the windings two poles directly opposite one another will be polarized "north" and two poles directly opposite one another and at right angles to the "north" polarized poles will be polarized "south" with the remaining poles in between polarized poles being neutral, whereby energization of the phase groups in sequence produces stepping action of the rotor, said rotor comprising a cylindrical permanent magnet, said rotor having a first pole shoe positioned to rotate adjacent surfaces of the stator poles, said rotor having a second pole shoe positioned to rotate adjacent a part of the motor housing whereby a flux circuit is produced through the rotor pole shoes, the housing and stator assembly.

7. A motor as in claim 6 wherein one of said pole shoes has axial peripheral teeth and the faces of the stator poles have axial teeth whereby upon energization of each phase group, the rotor teeth nearest the teeth of the stator poles of the opposite polarity to that of the rotor will lock in direct alignment.

8. A motor as in claim 7 wherein the teeth on the stator pole faces and the teeth on the rotor are of different pitch whereby upon energization of an individual phase group the middle tooth on the face of the said stator poles of opposite polarity will be aligned directly with one of the rotor teeth.

9. A motor as in claim 8 wherein the stator has eight poles with sixteen stator windings, each stator pole having five teeth and the rotor having fifty teeth with fifty spaces between teeth.

10. A motor as in claim 6 wherein the motor housing has an inwardly extending skirt portion co-eccentric with the axis of the housing, the second pole shoe being positioned to rotate within said skirt portion.

11. A motor as in claim 8 wherein the motor housing has an inwardly extending skirt portion co-eccentric with the axis of the housing, the second pole shoe being positioned to rotate with said skirt portion.

12. A rotor and stator assembly comprising a laminated core assembly having poles with windings thereon, a shaft having a rotor thereon, a housing, said rotor comprising a cylindrical member including pole shoes formed at the ends thereof, said rotor and pole shoes being oriented and positioned relative to the stator and housing such that the magnetic field is generally axial relative to the rotor and generally radial with respect to the stator, and includes part of the housing.

13. A structure as in claim 12 wherein the said housing has a part positioned adjacent one of said pole shoes to provide a path for the magnetic field.

14. A structure as in claim 13 wherein said part comprises an inwardly extending skirt, said one pole shoe being positioned to rotate within said skirt.

References Cited

UNITED STATES PATENTS

| 2,982,872 | 5/1961 | Fredrickson | 310—163 |
| 3,204,136 | 8/1965 | Kaiwa et al. | 310—49 |
| 3,281,655 | 10/1966 | Blasingame | 310—49 X |
| 3,374,410 | 3/1968 | Cronquist et al. | 318—138 |
| 3,124,733 | 3/1964 | Andrews | 310—156 X |
| 3,163,788 | 12/1964 | Powers | 310—45 |
| 3,164,735 | 1/1965 | Lichowsky | 310—156 |

WARREN E. RAY, Primary Examiner.

U.S. Cl. X.R.

310—156, 261